Oct. 8, 1935.  R. THOMAS  2,016,690

FILM GATE AND SEPTUM FOR PROJECTING MACHINES

Filed July 9, 1934

INVENTOR
RICHARD THOMAS,
BY Clyde L. Rogers
his ATTORNEY

Patented Oct. 8, 1935

2,016,690

UNITED STATES PATENT OFFICE 2,016,690

FILM GATE AND SEPTUM FOR PROJECTING MACHINES

Richard Thomas, Los Angeles, Calif., assignor of one-half to William Jennings Bryan, Jr., Los Angeles, Calif.

Application July 9, 1934, Serial No. 734,358

6 Claims. (Cl. 88—16.4)

This invention relates to the simultaneous projection of adjacent photographic images in superimposed relation upon a screen. More particularly the invention has to do with a system and method of projecting images in color wherein a projector is used having a double aperture through which adjacent frames of color film of different color values are simultaneously projected and focused upon a screen in superimposed relationship, by what is known as the additive method.

In such a system it is necessary to provide a septum or dividing wall between the two lens systems which are required to focus the light from the respective images, so that there can be no crossing or mingling of the light rays passing through the double film aperture and thence through the lenses to the screen. I have found that it is desirable and important for best results that such septum extend to the film surface, or, in case the film aperture plate is spaced before the film, to the surface of the dividing wall of the aperture plate. It is further important that provision be made for permitting access to the film track for the purpose of threading the film without disturbing the setting of the lenses. My invention comprises a novel film gate and septum member in combination, which attains the foregoing objects and also permits the focusing of the lenses with a movement of the lens septum member toward and away from the aperture plate without any crossing of the light rays whatever. My improved combination of film gate and septum member is also of value and importance in that it provides a strong and rigid friction bearing or support for the film at the locality of exposure, i. e. between the film apertures, thus effectively supporting each of the two exposed film areas and preventing what is known as bulge or weave or breathing of the film as it passes the exposure station and which tends to cause a distortion in the projected image.

The foregoing and other objects and advantages of the invention will be better understood from the following detailed decription taken in connection with the accompanying drawing and the distinctive features of novelty will be thereafter pointed out in the appended claims.

Referring to the drawing.

Figure 1:
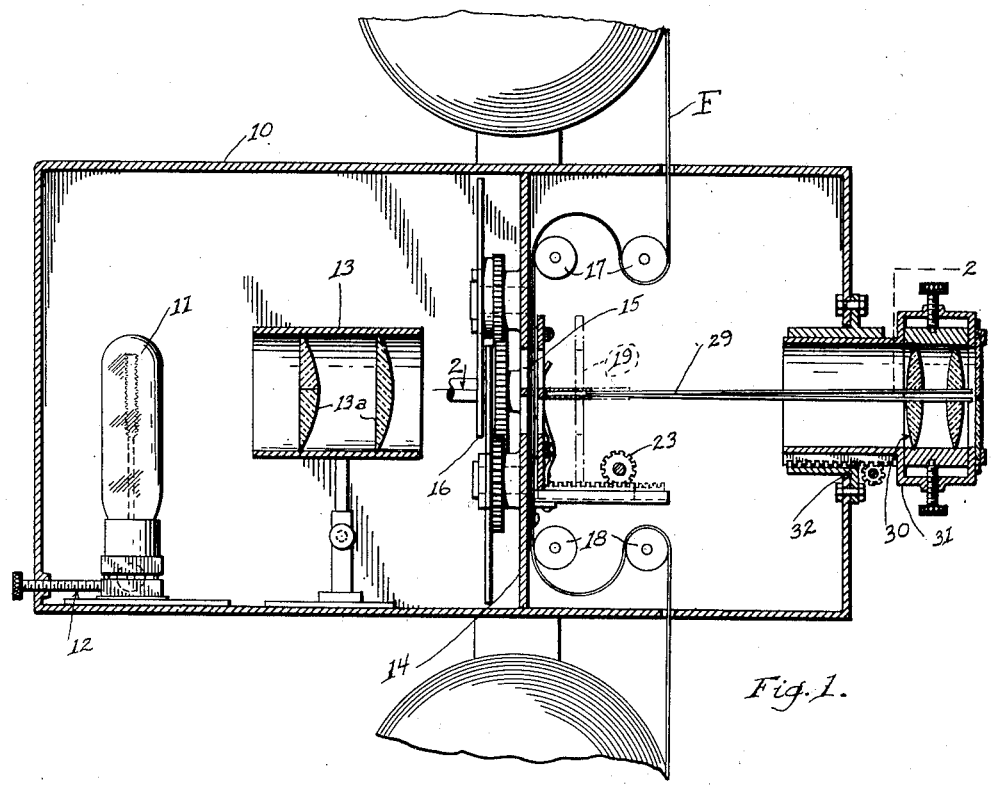
Figure 1 is a lengthwise vertical section showing an illustrative form of the invention.
Figures 2, 3, 4:
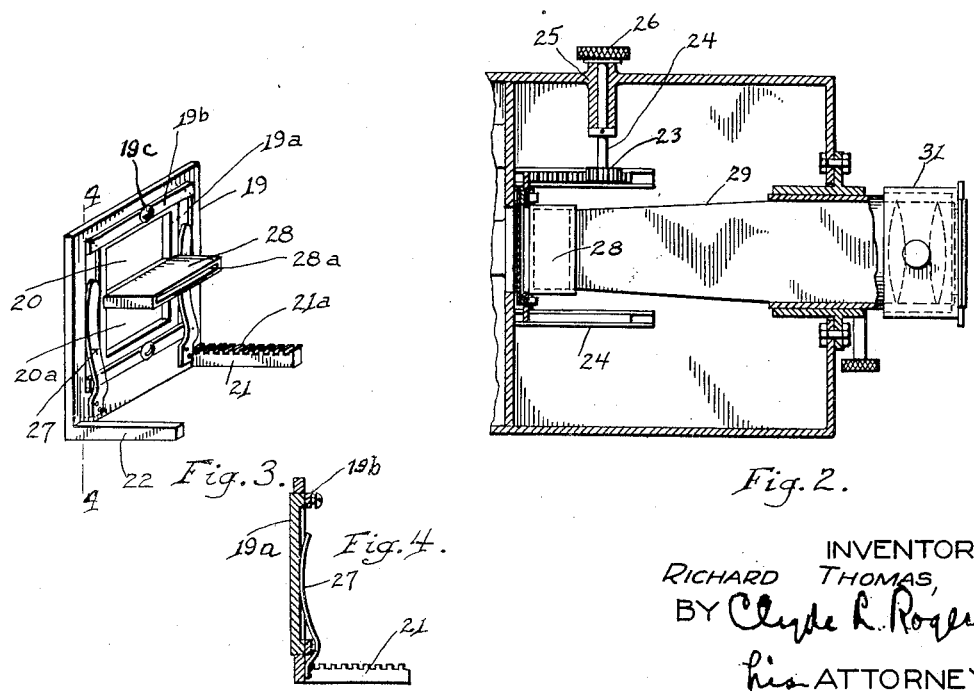
Figure 2 is a partial horizontal section on line 2—2 of Figure 1.
Figure 3 is a perspective view of the combined film gate and septum removed; and, Figure 4 is a sectional detail on line 4—4 of Figure 3.

10 indicates the housing of the apparatus, having adjustably mounted near the rear thereof a suitable light source shown as the lamp 11, the adjustment of which is effected by the screw 12. 13 denotes the condenser unit mounted in front of the light source 11 and equipped with suitable condensing lenses 13a, which specifically forming no part of the present invention are not further described herein. 14 indicates a plate or web extending transversely across the housing and provided centrally thereof with two adjacent film apertures 15. 16 indicates a pair of cooperative shutter plates geared together and driven in unison by gearing as shown, constituting a shutter mechanism which also forms specifically no part of this invention. Such shutter mechanism is more fully shown and claimed in my co-pending application Serial No. 734,359. F indicates the film strip which by means of upper and lower guide rolls 17, 18 respectively is guided directly in front of and against the plate 14. In accordance with my invention I provide a film gate 19 shown as a rectangular plate provided with two adjacent film apertures 20, 20a adapted to register with the apertures 15 in the plate 14. The gate 19 is mounted in position for such registry by having extending arms 21, 22 which are fitted and operate in slideways 23, 24 extending forwardly from the plate 14. A suitable means is provided for operating the film gate 19 so as to move it inward against the film and outward therefrom at will. For this purpose as shown, one of the arms, i. e. the arm 21, is provided with rack teeth 21a which are engaged by a pinion 23 fixed on a shaft 24 which is mounted with suitable bearings 25 in the housing and equipped with the operating head 26. The film gate 19 is formed at its opposite sides with vertical slots in which are fitted tension shoes 19a. These shoes are secured together at top and bottom by bars 19b having threaded therein adjusting screws 19c adapted to bear against the film gate to determine the extent that the tension shoes may be pressed inward against the film by the springs 27 which for this purpose are mounted on the film gate and react against the respective tension shoes. With this construction it may be understood that when it is desired to thread the film, the film gate 19 may easily be moved outward from the film to permit access thereto. After threading the film, the film gate may be adjusted closely thereagainst by turning the knurled head 26. As this is done the tension shoes 19a, which as best seen in Figure 4 project slightly outward from the film gate, will be resiliently pressed firmly upon the film by the springs 27. Any suitable means may be provided for locking the film gate in its adjusted position should the friction of the parts be insufficient for this purpose. My invention comprises in combination with the film gate described, a septum element which also constitutes a reinforcing and stiffening member for the film gate itself. This septum member is shown as a sheath or socket element 28, fixed to or forming a part of the film gate and located between the film apertures 20, 20a. This septum member extends outward from the film gate a distance slightly greater than the necessary range of adjustment of the film gate as described and it is formed with an opening 28a therein which is adapted to have slidingly fitted therein a cooperative septum device 29 which is associated with, and extends rearwardly from, the projecting lenses 30. The projecting lenses 30 are mounted in a holder 31 and together therewith constitute a unit which is slidingly adjustable for focusing purposes in the housing 10, as shown by a rack and pinion device 32. In this focusing movement of the lenses 30 it will be understood that the septum device 29 moves inward and outward therewith, and the length of the septum member 28 on the film gate is such that throughout the range of this movement as well as the described adjustment movement of the film gate itself, the septum member 29 remains in engagement with the socket 28a provided therefor in the septum member 28. While in the present illustrative embodiment the septum member 29 is shown in blade or plate form engaging a socket formation 28a in the septum member 28, it will be understood it is within the contemplation of the invention that this arrangement be reversed and the member 28 might be in the form of a blade or plate engaged and slidingly fitted in a socket formation borne by the septum member 29.

It is to be noted that the septum members 28, 29 cooperating as described constitute a telescopic septum device that extends at all times completely from the film to the projecting lens unit 31; and that this continuity of septum is preserved throughout the range of adjustments and movements both of the film gate 19 and of the projecting lens unit 31, thus insuring against any crossing or mingling of the light rays between the two lens systems at any time; also that the described manipulation of the film gate 19 to permit access to the film for threading or inspecting the same, in no wise disturbs the adjustment of the projecting lens unit or the disposition of the septum device.

I am aware that the invention may be embodied in other specific forms as to the several features thereof, and I therefore desire the present embodiment to be considered in all respects as illustrative and not restrictive, reference being had to the appended claims rather than to the foregoing description to indicate the scope of the invention.

Having described my invention, what I claim as new and desire to secure by Letters Patent is:

1. A double lens projecting system comprising an exposure station, a light condensing unit for directing light to said station, movable means between the exposure station and the lens system for guiding a film past said exposure station, said means including a septum member mounted for movement with said movable means into close proximity with the film and away therefrom at will, and an adjustable projecting unit equipped with a septum member cooperative with the first named septum member to constitute a septum device extending from the film path to the projecting unit.

2. In a double lens projecting system equipped with a double aperture exposure station with means to focus light thereupon, means to direct a film past the same and an adjustable projecting unit; a film gate mounted for movement to press closely upon the film as it passes the exposure station or to be spaced therefrom at will, and a telescopic septum device comprising an element borne by the film gate and another element borne by the projecting unit, said elements having telescopic engagement throughout the range of movement of the film gate and also throughout the range of focusing adjustment of the projecting unit.

3. A double lens system projecting apparatus comprising a double aperture exposure station, means for condensing light thereupon, means for directing a film past such station, a film gate mounted between the aperture plate and the lenses and equipped to press resiliently upon the film at the locality of the exposure station and to be moved away therefrom at will, an adjustable projecting unit, and an extensible septum device extending from the projecting unit to the film gate with part thereof borne by the film gate and adapted to preserve complete separation of the light rays of the two lens systems.

4. A double lens projecting system as described in claim 3, wherein a portion of the septum device is borne by the film gate and constitutes a reinforcement therefor.

5. In a double lens projecting system equipped with a double aperture exposure station with means for focusing light thereupon, and means for guiding a film past the same; a film gate mounted between the lens system and the exposure station for movement to engage closely the film at the exposure station or to be spaced outward therefrom at will to permit access to the film for threading the same, said film gate having double apertures and a septum member that constitutes also a reinforcing element for the film gate located between said apertures.

6. A double lens system projecting apparatus comprising a double aperture film plate, means for condensing light rays upon the apertures therein, means for guiding a film across such apertures, and a double apertured film gate mounted for rectilinear movement toward and away from the film to closely guide the film in cooperation with the film plate or to permit access to the film at will, said film gate equipped with a portion having a separate spring pressed movement for yieldingly pressing upon the film, and having also a reinforcing element between the two apertures that constitutes a septum extending toward the lens system.

RICHARD THOMAS.